Feb. 20, 1945.   N. G. BAKER   2,369,996
MARINE PROPULSION
Filed March 24, 1943   3 Sheets-Sheet 1
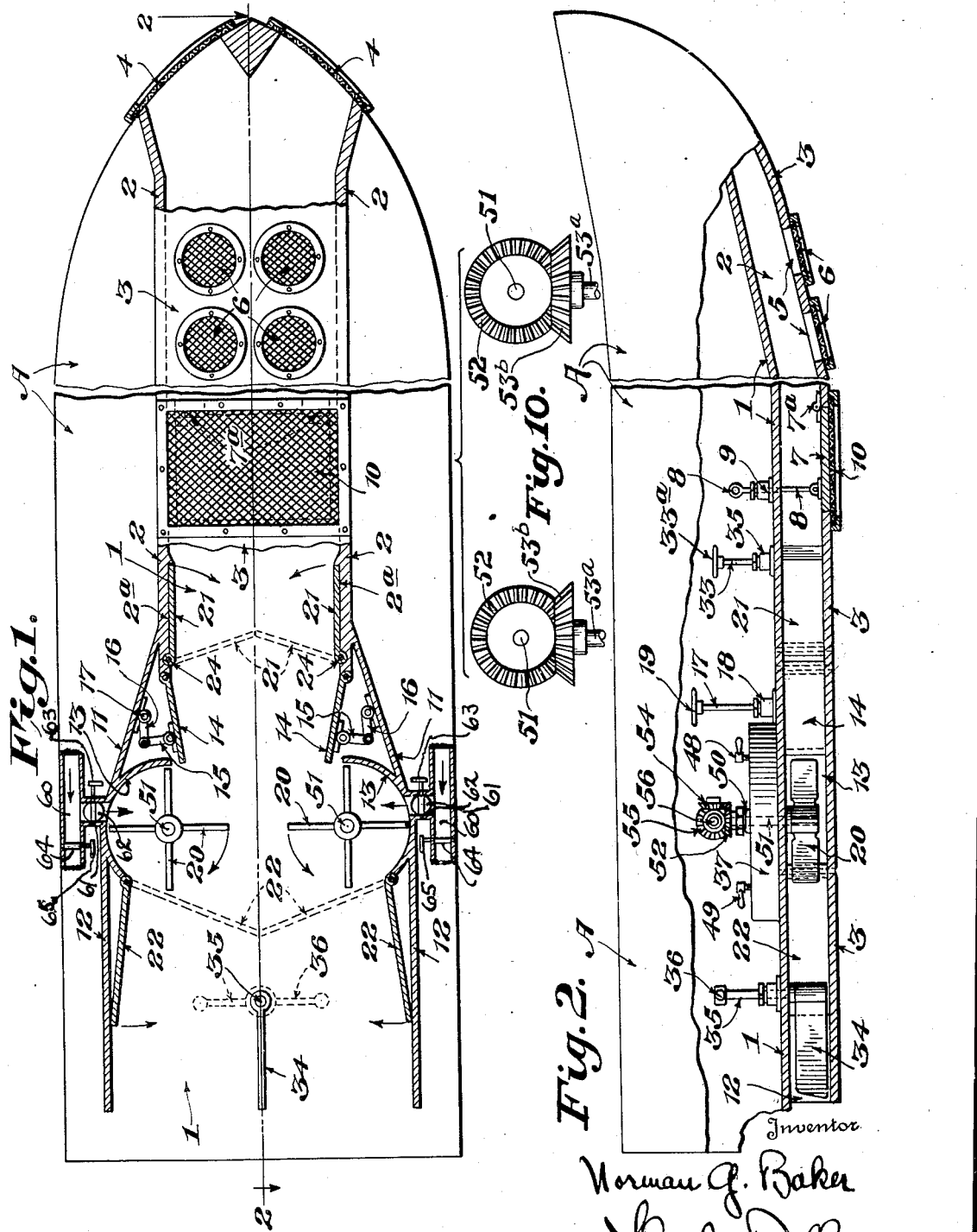

Feb. 20, 1945. N. G. BAKER 2,369,996
MARINE PROPULSION
Filed March 24, 1943 3 Sheets-Sheet 2
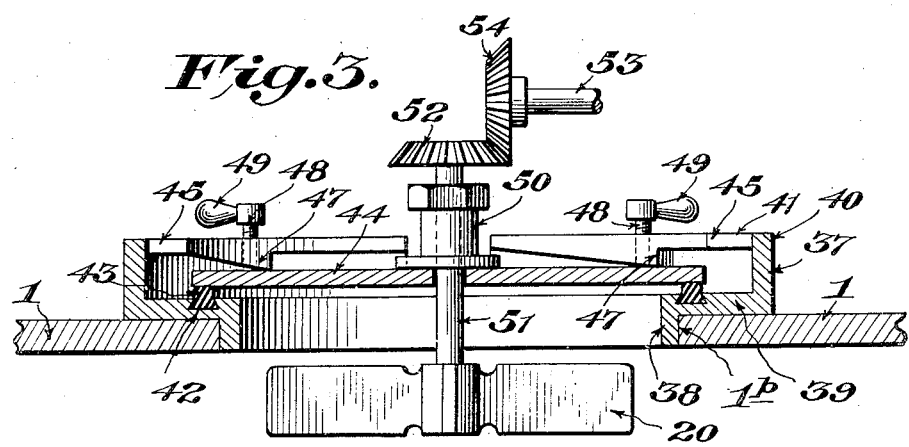
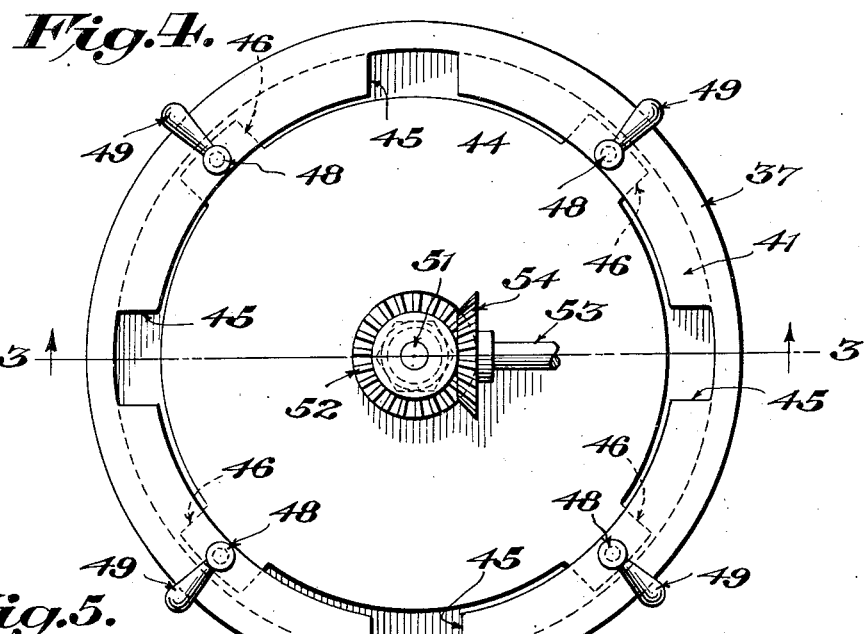
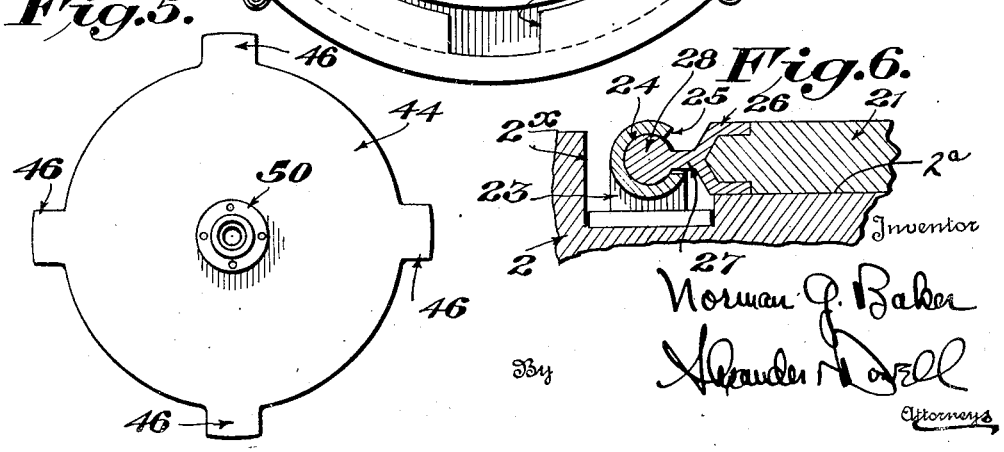

Feb. 20, 1945.  N. G. BAKER  2,369,996
MARINE PROPULSION
Filed March 24, 1943  3 Sheets-Sheet 3
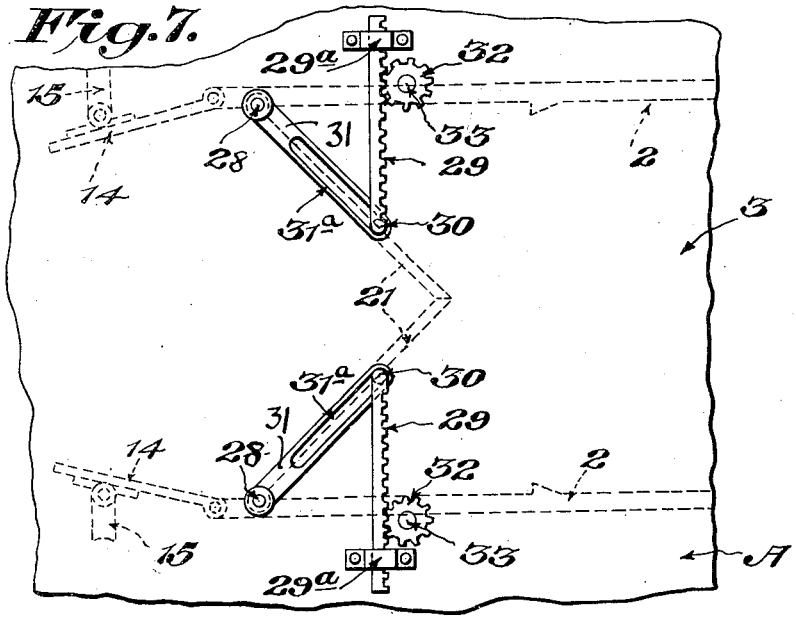
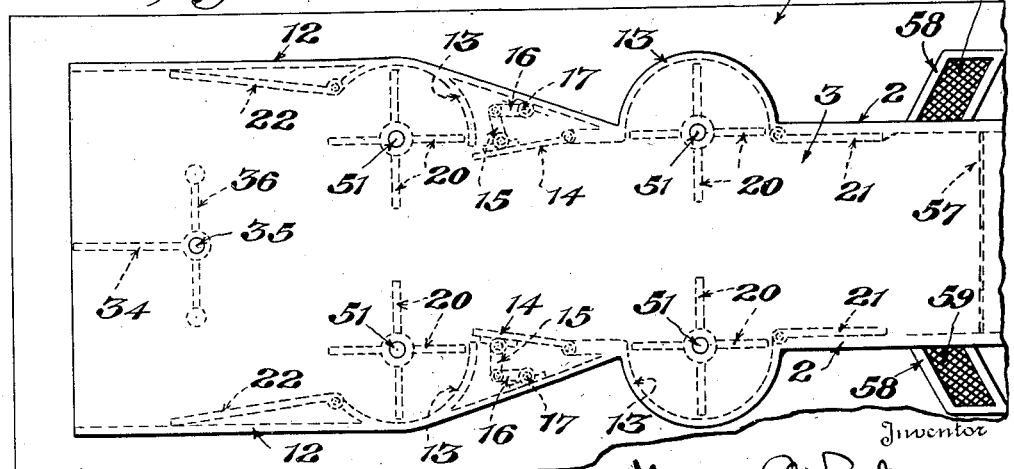
Inventor
Norman G. Baker
By Alexander Newell
Attorneys Patented Feb. 20, 1945

2,369,996

UNITED STATES PATENT OFFICE 2,369,996

MARINE PROPULSION

Norman G. Baker, Laredo, Tex.

Application March 24, 1943, Serial No. 480,387

17 Claims. (Cl. 115—53)

This invention is a novel improvement in marine propulsion, and the principal object thereof is to provide means for propelling ships or barges of any type, whether large or small, said means involving the use of a channel of general rectangular cross-section preferably formed within or immediately below the hull of the ship and extending longitudinally thereof, said channels having forwardly disposed openings permitting entry of water thereinto, or openings from the sides of the channel, or openings along the bottom of the channel, said channel being flared outwardly at its rear end having disposed therein one or more pairs of vertical shafts carrying opposed rotating paddle wheels normally driven in opposite directions and acting upon the body of the water within the channel to propel the ship, said channel at its rear end also housing the rudder, whereby the ship may be propelled and steered through shallow water, the paddle wheels and rudder being housed within and protected by the bottom and sides of the channel from contact with the ground or other objects.

Another object of the invention is to provide marine propulsion means of the above type having adjustable means in the channel in advance of the pair of opposed paddle wheels for narrowing or widening the stream of water passing through the channel at a point just in advance of the paddle wheels, said means also serving to set up eddy currents at the outer sides of the channel in advance of the paddle wheels serving to lessen drag or water resistance on the blades during their non-working strokes, i. e., while the blades are swinging forwardly of the channel into position to commence their working strokes.

A further object of the invention is to provide marine propulsion means of the above type in which the pair or pairs of paddle wheels at opposite sides of the channel may be rotated in the same direction, thereby providing a means for turning the ship around in substantially its own length.

A still further object of the invention is to provide marine propulsion means of the above type in which the paddle wheels are mounted upon watertight hatch plates fitted in the top of the water channel, said hatch plates being readily removable in order to give ready access from the inside of the ship to the respective paddle; said water channel being also provided at each side of the pair of paddle wheels, or series of pairs of paddle wheels, with normally open gates with means whereby same may be closed to cut off inflow of water from the portion of the channel occupied by the paddle wheels, so that when the gates are thus closed the same will form cofferdams permitting the water between the gates to be pumped out, after which the hatch plates may be removed and the paddles and mechanism disposed within said area may be repaired from the inside of the ship or vessel and while the latter is afloat.

Other minor objects of the invention will be hereinafter set forth.

I will explain the invention with reference to the accompanying drawings which illustrate several practical embodiments thereof, to enable others familiar with the art to adopt and use the same; and will summarize in the claims the novel features of construction, and novel combinations of parts, for which protection is desired.

In said drawings:

Fig. 1 is a bottom plan view partly in section, of a boat equipped with my novel propulsion means, showing the water channel and arrangement of gates, flow control means, paddles, and rudder contained in the water channel.

Fig. 2 is a side elevation thereof, partly in section, showing the water channel and arrangement of gates, flow control means, paddles, and rudder contained in the water channel.

Fig. 3 is an enlarged vertical section on the line 3—3, Fig. 4, taken through a watertight hatch, and showing the mounting of a paddle wheel thereon.

Fig. 4 is a top plan view of the parts shown in Fig. 3.

Fig. 5 is a plan view of a removable hatch-plate, detached.

Fig. 6 is an enlarged detail section through a hinge of the water gates shown in Fig. 1.

Fig. 7 is an enlarged view showing the means for actuating the forward cofferdam gates of the water channel.

Fig. 8 is a detail showing the drive for the opposed paddles utilizing a single engine for rotating the paddle wheels in opposite directions.

Fig. 9 is a view similar to Fig. 1, but showing a modified arrangement of paddles in the water channel, also a channel in which the water enters from the sides rather than from the front end thereof.

Fig. 10 is a detail showing the drive for the opposed paddles utilizing separate engines for rotating the paddle wheels in the same or opposite directions.

My invention is illustrated in connection with a barge or boat A which may be of any desired type. In the embodiment shown in Figs. 1 and 2, boat A is provided adjacent the bottom of its hull with an axially disposed water channel extending substantially the full length thereof, the channel consisting of an inner bottom 1, sides 2 and an outer bottom 3, the channel being preferably of rectangular cross-section and flaring outwardly at its bow end, said end being open to permit inflow of water thereto. The open bow end of the channel is preferably screened as at 4 to prevent ice, debris, or other objects from passing into said channel.

In addition to the bow opening the outer bottom 3 may be provided with a series of openings 5 which are also preferably screened as at 6. In the base of speed-boats in which a substantial part of the bow of the boat is disposed above the water-line during top speeds, a flap 7 may be provided at a point adjacent the midship section, said flap 7 being hinged as at 7a along its forward end and openable inwardly of the channel. An operating rod 8 passing upwardly through a stuffing box 9 on the inner bottom 1 may be provided for the purpose of opening or closing flap 7. Preferably the opening in outer bottom 3 for flap 7 is screened as at 10 to prevent entry of objects such as debris or ice into the channel.

The parallel side walls 2 of the channel preferably terminate at a point in rear of the midship section; and inclined walls 11 (Fig. 1) flare outwardly and rearwardly to a width greater than the main body of the channel for the purpose hereinafter described, while parallel walls 12 continue rearwardly from the rear ends of the inclined walls 11. At the rear ends of the outwardly flaring inclined walls 11 of the channel are a pair of opposed substantially semi-cylindrical walls 13 having their axes coinciding with the axes of paddle wheels 20, the semi-circular walls opening into the interior of the widened portion of the water channel, and the forward ends of the semi-cylindrical walls 13 being substantially in alignment with the side walls 2 of the main body of the water channel, as shown in Fig. 1.

Hingedly mounted on the rear ends of side walls 2 and forming continuations thereof, are a pair of doors 14 which are adjusted by links 15 mounted in brackets on the outer faces of the doors, the links being connected with cranks 16 carried by shafts 17 extending upwardly through stuffing boxes 18 on the inner bottom 1, said shafts carrying hand wheels 19 or the like whereby rotation of said hand wheels will individually adjust the angularity of doors 14 with respect to the side walls 2 of the main body of the water channel immediately in advance of the paddle wheels 20. Doors 14 are adapted to control the width of the stream of water passing in the channel immediately in advance of said paddle wheels, as clearly indicated in Fig. 1. The doors 14 when inclined inwardly direct the water away from the paddle wheel chambers or pockets. The deflected rapidly passing water at the doors 14 tends to create a vacuum or dead-water space in said pockets which is not solidly packed with fluid, and thus the wheel paddles within the pockets on their return strokes do not have to operate against solid water or rapidly flowing water, and thus back pressure on the blades is lessened or decreased. In Fig. 1 the engine exhaust pipes 60 pass adjacent each semi-cylindrical wall 13, and have lateral branches 61 discharging into the pockets slightly in advance of the axis of the walls 13, valves 62 being disposed in said branches 61 having operating levers 63. In the exhaust pipes 60 in reach of branches 61 are valves 64 controlled by levers 65. When valves 64 are open and valves 62 closed the exhaust is excluded from the pockets in walls 13. When valves 64 are closed and valves 62 open, the exhaust gases are directed into said pockets which are under partial vacuum and not solidly packed with fluid, said gases impinging upon the paddles 20 opposite branches of and assist in driving the paddle wheels. Moreover, the partial vacuum in the pockets and whirling blades 20 will quickly disperse the exhaust gases and cause a substantially noiseless exhaust.

A desirable feature of using the adjustable doors 14 is, that when the engine is propelling the vessel the doors may be adjusted to produce the greatest speed and locked in such position, or may be adjusted for efficient propulsion of the ship when proceeding through swift or still water currents.

Hingedly mounted adjacent the rear ends of the side walls 2 of the channel, in advance of the doors 14, are a pair of cofferdam gates 21 normally adapted when in open position to fill recesses 2a formed therefor in the faces of the side walls 2, and when in closed position shown in dotted lines in Fig. 1 to abut on the longitudinal axis of the water channel and thereby effectively prevent flow of water rearwardly therepast. Preferably the length of each gate 21 is slightly more than half the width of the main body of the water channel, and the gates swing forwardly into open position so that when the gates are closed, or in abutting relation, as shown in dotted lines, Fig. 1, the same will meet at an obtuse angle and the force of the water in the channel in advance of the closed gates 21 will tend to keep same firmly closed.

Hingedly mounted upon the rear ends of the semi-cylindrical walls 13, in rear of the paddle wheels 20, is a similar pair of cofferdam gates 22 adapted to be normally swung rearwardly into positions substantially parallel with the side walls 12 of the water channel, as shown in full lines in Fig. 1, said gates 22 when closed being adapted to abut at an obtuse angle shown in dotted lines in Fig. 1 to effectively prevent flow of water forwardly therepast, the pressure of water in the channel in rear of the closed gates 22 tending to keep same firmly closed.

Thus when the two pairs of gates 21—22 are in closed positions as shown in dotted lines in Fig. 1, the water in the channel between the gates may be pumped out while the ship is afloat in mid-stream, and access readily had to such pumped out compartment as hereinafter described for the purpose of repairing vital parts such as the paddle wheels 20 and the aforementioned doors 14 and their operating mechanism.

The pairs of gates 21—22 when closed completely fill the channel from top to bottom and from side to side. Each gate such as 21 may be hinged to the side wall 2 of the channel or the end of semi-cylindrical wall 13 thereof by a hinged joint such as shown in Fig. 6, in which a bracket 23 is mounted in a recess 2x in the rear end of recess 2a of side wall 2, bracket 23 being provided with a parti-cylindrical socket 24 having a gap 25, said socket extending the full height of the channel. On the adjacent end of gate 21 is secured in a water-tight manner a fitting 26 extending the full height of the gate, said fitting being provided with a web 27 entering the gap 25 and carrying a cylindrical head 28 closely fitting the socket 24, whereby gate 21 may be swung from open to closed position without appreciable leakage of water at the hinge. The gates 22, and doors 14 may, if desired, be provided with similar hinge brackets and fittings.

Each of the gates 21—22 may be opened and closed by mechanism illustrated in Figs. 2 and 7. Rack bars 29 are slidably mounted in guides 29a and have pins 30 at their inner ends slidably engaged in slots 31a in arms 31 mounted on the hinge pins 28 of the gates 21. Meshing with each rack bar 29 is a gear 32 on a vertical shaft 33 passing upwardly through a stuffing box 35 on the inner bottom 1, each shaft 33 carrying a hand-wheel 33a on its upper end. If desired, the shafts 33 may be interconnected together for simultaneous movement so that the gates may be opened and closed in unison.

In the rear end of the channel, on the axes thereof, is a rudder 34 mounted upon a rudder post 35 extending upwardly through the inner bottom 1 and carrying a T-head 36 whereby the ship may be steered by reaction of the rudder against the water in the channel.

In the inner bottom 1, concentric with each of the semi-cylindrical walls 13, is an annular casting 37 (Figs. 2, 3 and 4), said casting having a depending annular portion 38 (Fig. 3) fitted in a watertight packing in a correspondingly shaped opening 1p in inner bottom 1, casting 37 having an annular base 39 overlying inner bottom 1, said base 39 having an upturned peripheral flange 40 carrying at its upper end an internal annular flange 41 overlying the base 39 as clearly indicated in Fig. 3. In the top of base 39 is an annular groove 42 carrying an annular packing strip 43 whereby the removable hatch plate 44 when inserted in the casting 37, will make a watertight fit therewith. The upper flange 41 of casting 37 is provided with a series of slots 45 (four being shown in Fig. 4) evenly spaced apart, and the hatch plate 44 (Fig. 5) is similarly provided with a corresponding number of correspondingly shaped projections 46 so that the cover plate 44 may be inserted down between flange 41 and base 39 of casting 37 when the projections 40 and notches 45 register. Upper flange 41 between adjacent notches 45 is provided on its underside with downwardly inclined lugs 47 (Fig. 3) so that when hatch plate 44 is inserted down into casting 37 and rotated to bring the projections 46 out of register with notches 45, the plate 44 will be depressed by wedging action against lugs 47 and forced down into firm contact with the annular packing strip 43 to provide a watertight engagement between plate 44 and casting 37. In order to firmly bind the plate 44 and casting 37 in such engagement, screws 48 are tapped down through flange 41 of casting 37 adjacent the lowermost ends of lugs 47, said screws being provided with handles 49 whereby same may be manually rotated to lower the screws 48 into engagement with the projections 46 of hatch plate 44 and forcibly depress plate 44 down upon packing 43.

Disposing axially of each hatch plate 44 is a stuffing box journal 50 in which a shaft 51 is journaled carrying a paddle wheel 20 below the plate 44 normally disposed concentrically of the related semi-cylindrical wall 13 of the water channel, the blades of the paddle wheel 20 normally rotating in close proximity to but slightly spaced from the wall of semi-cylindrical plate 13. Each paddle wheel shaft 51 carries on its upper end a bevel gear 52. Normally both paddle wheels 20 are rotated in opposite directions as shown by the arrows in Fig. 1, a convenient means comprising a single engine drive shaft 53 (Figs. 2 and 3) carrying a bevel gear 54 meshing with a bevel gear 55 (Fig. 8) on a shaft 56 carrying a pair of spaced bevel gears 56a meshing with the respective bevel gears 52 of the paddle wheel shafts 51 to rotate paddle wheels 20 in opposite directions, which is the normal direction of rotation of the pair of paddle wheels to propel the boat. However, the paddle wheels 20 may, if desired, be driven by separate engine shafts 53a (Fig. 10) so that the wheels may be caused to rotate in opposite directions or in the same direction, such latter arrangement permitting the boat to turn around in substantially its own length. In Fig. 10 the separate engine shafts 53a carry bevel gears 53b meshing directly with the bevel gears 52 on the upper ends of paddle wheel shafts 51.

In Fig. 9 a modification is shown in which the parts corresponding with those in Figs. 1 to 8 are similarly lettered. In this modification however the water channel need not extend to the bow of the ship but may terminate at a point adjacent or in advance of the mid-ship section and may be closed at its forward end by means of a wall 57, and the entrance to the water channel formed by lateral wings 58 extending through the side walls 2 of the channel and opening at the sides of the ship, the openings being covered by screens 59. Thus the water may enter the channel at the sides rather than the bow end of the vessel. The outer bottom 3 of the water channel may be similarly be provided with screened openings 5, and with a hatch 7 having a screen 10 over the opening therefor, in the same manner indicated in Figs. 1 and 2, the use of the openings 5 and hatch 7 being dependent upon the length of the vessel.

In this modification a plurality of pairs of paddle wheels 20 are shown rather than a single pair, each of the paddle wheels being housed concentrically of semi-cylindrical walls 13 formed in the sides of the water channel and it is to be understood that each of the paddle wheel shafts 51 would be journaled on hatch plates 44 in the same manner as indicated in Figs. 3 and 4.

In this modification the cofferdam gates 21—22 are arranged and operated in the same manner as that described in connection with Figs. 1 to 8, but are arranged so as to embrace the pairs of opposed paddle wheels 20 so that when the gates 21—22 are closed and the water between the cofferdam pumped out and the cover plates 44 removed access may be had for the purpose of repairing the paddle wheels, doors 14 or their operating mechanism, while the ship is afloat, the repairs being performed from the inside of the ship, thus obviating the necessity of having to drydock the ship in order to repair vital parts of the propelling means.

The advantages of my novel means of propulsion are, that the blades and rudder are protected from damage by hitting obstructions; the blades of the wheels during their working strokes are always directed against a solid body or stream of water to insure full blade power as distinguished from the customary stern propeller, especially in small boats and in large vessels during storms, in which said propellers are often raised out of the water completely or practically and thereby lose power by lack of water volume, causing the engine to race; a full flat blade propeller may be used in such manner that the partial vacuum in the blade pockets during the return strokes of the blades which is caused by the swiftly moving water past the working blades, greatly reduces the water resistance during the back strokes of the blades; the propulsion may be used in boats of shallow draft, such as used by hunters, or by troops landing in shallow waters, while retaining its adaptability for larger boats; a shatterproof glass or plastic hatch cover 44 over the wheels 20 or part of wheel area would afford inspection at all times; and in small boats or large, the bow channel opening need not be used, but water may be admitted into the channel by bottom or side openings angled towards the direction of travel to insure a constant steady stream of water to the wheels under all conditions.

Moreover, my novel propulsion means affords the opportunity of placing the wheels 20 anywhere within the boat's length. For instance, if the wheels 20 were at the middle of said length and twin engines used with reverse gears as usual then the boat could be turned completely around in its own length, or if located at a point one-third the length of the boat from the stern, the boat could turn around in a very short space, which when adjacent crowded docks or in narrow channels would be of great advantage. One wheel in "reverse" and one in "forward" would act as a "top" spinning to turn the boat provided the wheels are disposed central of the boat's length. Also an advantageous placing of the wheels would permit a more advantageous placing of the engines, and would afford use of a shorter propeller shaft by placing the wheel near the engine.

I do not limit my invention to the exact forms shown in the drawings, for obviously changes may be made therein within the scope of the claims.

I claim:

1. In a boat, an open-ended water channel extending axially thereof below the water-line and having a top, bottom, and side walls, the width of the channel increasing adjacent the rear end; a pair of opposed substantially semi-cylindrical walls disposed within the wider portion of the channel at opposite sides thereof, said walls being disposed on vertical axes and opening inwardly of the channel; paddle wheels disposed axially of the semi-cylindrical walls; means for normally rotating said wheels in opposite directions; swingable doors extending from the side walls of the channel at the narrower portion thereof in advance of the semi-cylindrical walls and terminating adjacent the forward edges of said semi-cylindrical walls; and means for adjusting the said doors.

2. In a boat as set forth in claim 1, said channel having openings in its bottom in advance of the hinged connections of the doors for admitting water thereinto.

3. In a boat as set forth in claim 1, said channel having an opening in its bottom adjacent the mid-ship section and in advance of the hinged connections of the doors; an inwardly opening flap hinged along its forward edge and normally filling said opening; and means for opening and closing the said flap.

4. In a boat as set forth in claim 1, said means for rotating the wheels including an engine having exhaust pipes disposed adjacent the semi-cylindrical walls; and said pipes having valved branches adapted to discharge the exhaust gases into the pockets formed between the semi-cylindrical walls and the paddles of the wheels.

5. In a boat as set forth in claim 1, said doors when in fully opened position forming continuations of the side walls of the narrower portion of the channels and contacting the forward ends of the semi-cylindrical walls, and when swung inwardly of the channel said doors narrowing the stream of water at a point immediately in advance of the paddle wheels, thereby setting up a partial vacuum causing decreased water pressure in the pockets formed between the blades of the wheels and the semi-cylindrical walls.

6. In a boat as set forth in claim 1, watertight hatches in the top wall of the channel disposed concentrically of the semi-cylindrical walls, removable cover plates for said hatches; and journals for the paddle wheels mounted in the cover plates.

7. In a boat, an open-ended water channel extending axially thereof below the water-line and having a top, bottom, and side walls, the width of the channel increasing adjacent the rear end; a pair of opposed substantially semi-cylindrical walls disposed within the wider portion of the channel substantially tangent to the opposite sides thereof, said walls being disposed on vertical axes and opening inwardly of the channel; paddle wheels disposed axially of the semi-cylindrical walls, means for normally rotating said wheels in opposite directions; swingable doors extending from the side walls of the channel at the narrower portion thereof in advance of the semi-cylindrical walls and terminating adjacent the forward edges of said semi-cylindrical walls; means for adjusting the said doors; and a rudder mounted in the rear end portion of the channel.

8. In a boat as set forth in claim 7, said channel having openings in its bottom in advance of the hinged connections of the doors for admitting water thereinto.

9. In a boat as set forth in claim 7, said channel having an opening in its bottom adjacent the midship section and in advance of the hinged connections of the doors; an inwardly opening flap hinged along its forward edge and normally filling said opening; and means for opening and closing the said flap.

10. In a boat as set forth in claim 7, said doors when in fully opened position forming continuations of the side walls of the narrower portion of the channels and contacting the forward ends of the semi-cylindrical walls, and when swung inwardly of the channel said doors adjusting the width of the stream of water reacted upon by the paddle wheel blades on their working strokes, and simultaneously setting up a partial vacuum causing decreased water resistance to the blades on their return strokes disposed in the pockets formed between the blades and the semi-cylindrical walls.

11. In a boat as set forth in claim 7, watertight hatches in the top wall of the channel disposed concentrically of the semi-cylindrical walls; removable cover plates for said hatches; and journals for the paddle wheels mounted in the cover plates.

12. In a boat, an open-ended water channel extending axially thereof below the water-line and having a top, bottom, and side walls, the width of the channel increasing adjacent the rear end; a pair of opposed substantially semi-cylindrical walls disposed within the wider portion of the channel at opposite sides thereof, said walls being disposed on vertical axes and opening inwardly of the channel; paddle wheels disposed axially of the semi-cylindrical walls, means for normally rotating said wheels in opposite directions; swingable doors extending from the side walls of the channel at the narrower portion thereof and terminating adjacent the forward edges of the semi-cylindrical walls; means for adjusting the said doors; and cofferdam gates hingedly mounted in the channel embracing the rear ends of the semi-cylindrical walls and the hinged ends of the doors and adapted when closed to seal the channel; and means for closing and opening the said gates.

13. In a boat as set forth in claim 12, said channel having openings in its bottom in advance of the hinged connections of the doors for admitting water thereinto.

14. In a boat as set forth in claim 12, said channel having an opening in its bottom adjacent the mid-ship section and in advance of the forward gates; an inwardly opening flap hinged along its forward edge and normally filling said opening; and means for opening and closing the said flap.

15. In a boat as set forth in claim 12, said doors when in fully opened position forming continuations of the side walls of the narrower portion of the channels and contacting the forward ends of the semi-cylindrical walls, and when swung inwardly of the channel said doors adjusting the width of the stream of water reacted upon by the paddle wheel blades on their working strokes, and simultaneously setting up a partial vacuum causing decreased water resistance to the blades on their return strokes disposed in the pockets formed between the blades and the semi-cylindrical walls.

16. In a boat as set forth in claim 12, watertight hatches in the top wall of the channel disposed concentrically of the semi-cylindrical walls; removable cover plates for said hatches; and journals for the paddle wheels mounted in the cover plates.

17. In a boat as set forth in claim 12, said gates comprising sections hinged at each side of the channel; and said sections when closed abutting at obtuse angles transversely of the channel, whereby the water pressure within the channel outside the gates will assist in maintaining same closed.

NORMAN G. BAKER.